United States Patent
Bhat

(10) Patent No.: US 10,162,735 B2
(45) Date of Patent: Dec. 25, 2018

(54) DISTRIBUTED SYSTEM TEST AUTOMATION FRAMEWORK

(71) Applicant: Red Hat Inc., Raleigh, NC (US)

(72) Inventor: Vishwanath Subray Bhat, Bangalore (IN)

(73) Assignee: Red Hat, Inc., Raleigh, NC (US)

( * ) Notice: Subject to any disclaimer, the term of this patent is extended or adjusted under 35 U.S.C. 154(b) by 286 days.

(21) Appl. No.: 15/056,807

(22) Filed: Feb. 29, 2016

(65) Prior Publication Data
US 2017/0091075 A1 Mar. 30, 2017

Related U.S. Application Data

(60) Provisional application No. 62/235,525, filed on Sep. 30, 2015.

(51) Int. Cl.
*G06F 11/36* (2006.01)

(52) U.S. Cl.
CPC ...... *G06F 11/3664* (2013.01); *G06F 11/3688* (2013.01)

(58) Field of Classification Search
CPC .......................... G06F 11/3664; G06F 11/3688
USPC .......................................................... 717/124
See application file for complete search history.

(56) References Cited

U.S. PATENT DOCUMENTS

| | | | |
|---|---|---|---|
| 7,702,766 B2 | 4/2010 | Weir et al. | |
| 7,809,988 B1 | 10/2010 | Portal et al. | |
| 7,827,438 B2 | 11/2010 | Tarta | |
| 8,046,638 B2 | 10/2011 | Bloching et al. | |
| 8,862,933 B2 | 10/2014 | Manglik et al. | |
| 8,914,329 B1 | 12/2014 | Chandra et al. | |

(Continued)

FOREIGN PATENT DOCUMENTS

CN 104536988 A 4/2015

OTHER PUBLICATIONS

Kiran Patil. (Feb. 26, 2015). Functional Test Suite of Glusterfs. Retrieved from http://comments.gmane.org/gmane.comp.file-systems.gluster.user/19563 on Sep. 16, 2015. 4 pages.

(Continued)

*Primary Examiner* — John Q Chavis
(74) *Attorney, Agent, or Firm* — Lowenstein Sandler LLP

(57) ABSTRACT

Described herein is a method for testing distributed systems. The method includes receiving, by a processing device, a software testing executable script. The method also includes appending, by a processing device, the software testing executable script to a list of executable scripts. The method also includes defining, by a processing device, a test environment including a management node and a testable component of a distributed network. The method also includes establishing, over the distributed network, a trusted connection between the management node and the testable component. The method also includes receiving, at the management node, an identifier of the software testing executable script, an identifier of a target for executing the software testing executable script, and a schedule for executing the software testing executable script. The method also includes executing, by the management node, in view of the schedule, the identified software testing executable script with respect to the target.

20 Claims, 12 Drawing Sheets

(56) References Cited

U.S. PATENT DOCUMENTS

| | | | | |
|---|---|---|---|---|
| 2008/0313611 | A1* | 12/2008 | Linville | G06F 11/3688 |
| | | | | 717/115 |
| 2009/0265681 | A1* | 10/2009 | Beto | G06F 11/3672 |
| | | | | 717/100 |
| 2015/0081243 | A1 | 3/2015 | Ganai et al. | |
| 2015/0301071 | A1* | 10/2015 | Dhan | G01N 35/0092 |
| | | | | 702/108 |
| 2015/0324276 | A1* | 11/2015 | Rumble | G06F 11/3692 |
| | | | | 714/38.14 |
| 2015/0339213 | A1* | 11/2015 | Lee | G06F 11/3664 |
| | | | | 717/125 |
| 2017/0039372 | A1* | 2/2017 | Koval | G01D 4/004 |

OTHER PUBLICATIONS

M S Vishwanath Bhat. (2015). DISTAF Gluster Test Automation Framework. Retrieved from http://redhat.slides.com/rtalur/distaf#/ on Sep. 16, 2015. 2 pages.

Giacinto Donvito, Giovanni Marzulli, Domenico Diacono. (2014). Testing of Several Distributed File-Systems (HDFS, Ceph and GlusterFS) for Supporting the HEP Experiments Analysis. Retrieved from http://iopscience.iop.org/article/10.1088/1742-6596/513/4/042014/pdf on Sep. 16, 2015. 8 pages.

Nathan Wilkerson. (Apr. 21, 2014). AWS NAS Test. Retrieved from http://www.metaltoad.com/blog/aws-nas-test on Sep. 16, 2015. 10 pages.

\* cited by examiner

```
from libs.util import tc as distaf

# Variable containing Test Environment
servers = distaf.nodes
master_node = servers[0]
clients = distaf.clients
client_0 = clients[0]

# Logging
distaf.logger.info("My Info message")
distaf.logger.debug("Other debug message")
```

FIG. 10A

```
from libs.util import tc as distaf retcode, stdout, stderr = distaf.run(server, command)

async_r = distaf.run_async(server, command)
# Do other stuff here
async_r.wait()
retcode, stdout, stderr = async_r.value()

conn = distaf.get_connection(server, user)
remote_host = conn.modules.socket.gethostname()
if conn.modules.os.path.exists(somepath):
  #Perform some action here ret = distaf.add_user(server, user)
```

FIG. 10B

```
from libs.util import tc, testcase
from libs.peer_ops import peer_probe
from libs.volume_ops import create_volume, start_volume
from libs.mount_ops import mount_volume @testcase("gluster-basic")
def gluster_basic_vol_create():
  tc.logger.info("Create and start a gluster volume and mount it")

ret = peer_probe(mserver, servers[1:])
  if not ret:
    tc.logger.error("peer probe failed")
    _retcode = False ret = create_volume(volname, dist_count, rep_count, trans=trans)
  if not ret:
    tc.logger.error("Unable to create volume %s. Please check the logs" %
volname)
    _retcode = False ret = mount_volume(volname, 'glusterfs', mountpoint, mclient=client)
  if not ret:
    tc.logger.error("mounting volume %s via fuse failed on %s" % (volname,
client))
    _retcode = False return _retcode
```

FIG. 10C

```
python main.py -d "geo_rep"

python main.py -t "geo-rep-0 snapshot-0 tiering-0"

python main.py -d "geo_rep" -t "geo-rep-0 geo-rep-1 geo-rep-2"
```

FIG. 10D

DISTRIBUTED SYSTEM TEST AUTOMATION FRAMEWORK

RELATED APPLICATIONS

This application claims the benefit of U.S. Provisional Application No. 62/235,525, filed Sep. 30, 2015, and entitled "Distributed System Test Automation Framework," the entire contents of which are incorporated herein by reference.

TECHNICAL FIELD

The present disclosure is generally related to distributed computer systems, and is more specifically related to a framework for managing tests of distributed systems.

BACKGROUND

Centralized test systems provide developers with the ability to test new and existing systems. Development and administration of these tests may be complicated and resource intensive. For example, writing and setup of a test for execution to one or more machines may be tedious and difficult. Writing of the test itself may also be complicated and daunting with a relatively steep learning curve. Coordination of multiple steps of testing can be counter-intuitive and difficult to write as well as execute properly. Execution of the test may be challenging as it may require that the test system include an administrator portion as well as a portion installed on the machines to be tested.

BRIEF DESCRIPTION OF THE DRAWINGS

The present disclosure is illustrated by way of examples, and not by way of limitation, and may be more fully understood with references to the following detailed description when considered in connection with the figures, in which:

FIGS. 10A-10D depict example code for a test framework for distributed networks in accordance with one or more aspects of the present disclosure.

DETAILED DESCRIPTION

Described herein are methods and systems for management of tests on distributed computer systems. A distributed system may be provided by a network attached storage (NAS) system comprising one or more server computer systems each coupled to one or more persistent data storage devices, such as magnetic or optical storage disks, solid-state drives (SSDs), etc. "Computer system" herein shall refer to a system comprising one or more processors, one or more memory devices, and one or more input/output (I/O) interfaces.

Figure 1:
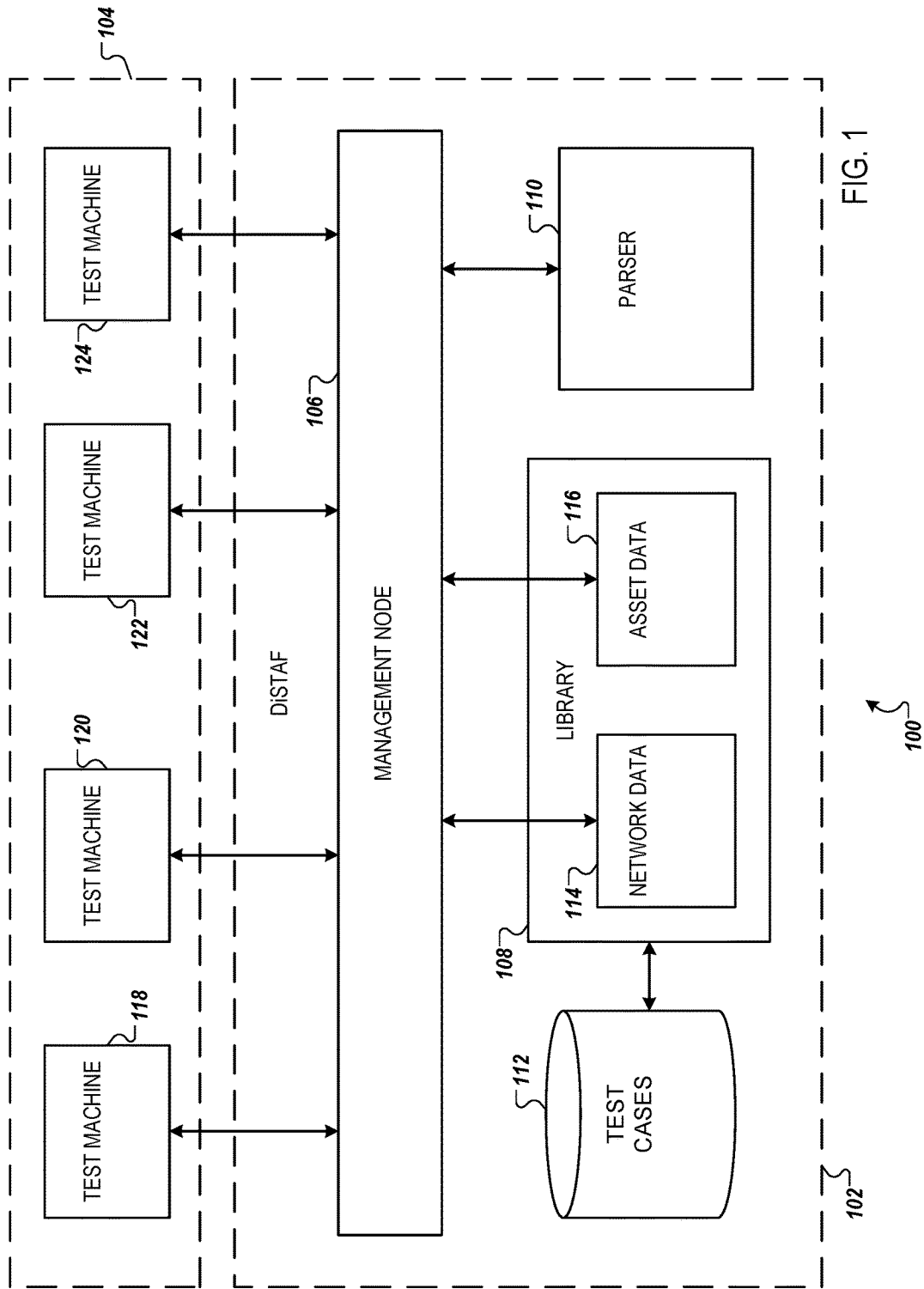
FIG. 1 depicts a high-level component diagram of an example of a test system 100 for a distributed computer system in accordance with one or more aspects of the present disclosure.

FIG. 1 depicts a high-level component diagram of an example of a test system 100 for a distributed computer system in accordance with one or more aspects of the present disclosure. The illustrated example includes a framework 102 in communication with a distributed system 104. In some examples, the framework 102 is a distributed system test automation framework (DiSTAF). The illustrated framework 102 includes a management node 106, a library 108, a parser 110, and a test cases repository 112. The library 108, as depicted, includes network data 114 and asset data 116.

The distributed system 104 may include a specialized or general purpose distributed file system. The system 104 may aggregate storage exports over network interconnect to provide a single unified namespace. The distributed system 104 may be implemented in stackable user space modules. In some examples, some or all of the distributed system 104 may be implemented in the kernel space.

The distributed system 104 may be extensible and modular with a unified access to a range of structured, semi-structured, and unstructured information. In some examples, the distributed system 104 may include no external servers to handle metadata while other examples may include external servers to manage metadata or other information associated with the system 104. In one example, the distributed system 104 may include test machines 118-124. One or more of the test machines 118-124 may include physical machines, virtual machines, containers, or other resources.

The distributed system 104 may implement various storage strategies. For example, the distributed system may distribute a storage volume across multiple storage locations. Redundancy and distributed redundancy may also be incorporated.

The distributed system 104 may include translators that may be stacked or operate alone or independently. The translator may provide deployment specific or agnostic operation. The translators may operate from either client or server stacks. In some examples, the distributed system 104 manages unstructured data, provides archiving functionality, disaster recover, virtual machine image storage, cloud storage, content cloud storage, big data storage, structured storage, and semi-structured storage. Other storage schemes may also be incorporated.

The framework 102 for management of tests on the distributed system 104 may be written in various programming languages. In one example, the framework 102 is written in Python. The framework 102 may include a management node or client. In some examples, the management node 106 is the node from which a test case or suite of cases is executed. This node 106 is responsible for orchestration of test automation. The management node 106 interfaces with one or more of the test machines 118-124. These may include one, some, or all the machines/nodes/servers/clients participating in or targeted by the tests.

In one example, test machines 118-124 run a secure shell (ssh) tunnel. The management node may connect to test machines 118-124 using rpyc zero-deploy or another tool which makes use, internally, of the ssh tunneling protocol for establishing and maintaining the secure connections. In one example, the secure connection is kept open for the entire duration of the tests. The synchronous commands or test scripts of the test cases may be executed over the secure connection. A synchronous command is a command that is run after the completion of a previous command and is completed before the execution of the next command. In another example, for asynchronous commands, a new connection is opened and will be closed when the asynchronous command returns. An asynchronous command is a command that is processed with a timing that fully or partially overlaps with a timing of another command (i.e. begun at the same time as another command or initiated before the completion of another command).

In another example, the management node 106 may determine what operating system or applications are running on the test machine 118-124 and provide a connection to that test machine that is secure in light of the determined operating system or applications. In one example, the management node 106 may access the network data 114 to determine a nature of the distributed system 104 and the asset data 116 to determine specifics about each test machine 118-124. The network data 114 and the asset data 116 may be specific for a particular system or testable component or generic to cover a range of types of systems and testable components.

The management node 106 may access test cases from a global list within the test case repository 112 via the library 108. The library 108 may provide the advantage of preventing issues caused by library block/unblocking. In one example, the parser 110 may assist with identification of a test environment which may include all or part of the distributed network as well as one or more specific components or devices to be tested. The parser 110 may process information regarding the server, client, volume, or other configuration information such as a "config" file associated with the test environment or the specific components to be tested.

Various modules may be implemented to execute a test on the distributed system 104. Advantages of examples of the test framework described herein include a lightweight implementation which reduces the learning curve of a user and provides a simple framework for writing tests, connecting to distributed systems, managing connections, executing tests, and recording result logs. Examples of the system implement simple structures such as APIs. The APIs facilitate a basic knowledge of programming languages to translate a test idea (for example, a plain English description of a test) into useable code for executing a test. Examples of the test framework are compatible with various systems including various operating systems. Examples of the test framework described herein do not require processes running on the test machines to execute a test. This allows the test to be run more smoothly and does not require separate interaction with the test machines prior to executing the test. This simplifies the number and complexity of libraries that must be available for the tests. Examples of the test framework need only an IP address or resolvable hostname in order to connect to the test machine. The connection between the management node and the test machine may be secured through authentication. The test machines may include physical machines, hardware servers, virtual machines, applications containers, or other computing structures or network components or assets In some examples, the execution of a test case may directed by an identifier for a software testing executable script, an identifier for a target for execution of the script, and a schedule for execution of the script. For example the identifiers may indicate one or more target components, one or more test scripts to execute, one or more conditions to trigger a test, a directory from which to pull a test, or other variables. The test script may be a binary executable module, shell script, or the like.

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). "Memory device" herein shall refer to a volatile or non-volatile memory device, such as RAM, ROM, EEPROM, or any other device capable of storing data. "Communication interface" herein shall refer to circuitry or device communicatively coupled to one or more processors and capable of routing data between the processors and one or more external devices.

In certain implementations, the systems and methods described herein may be employed for testing applications utilizing distributed file systems and/or for testing various components of the distributed file systems.

Figure 2:
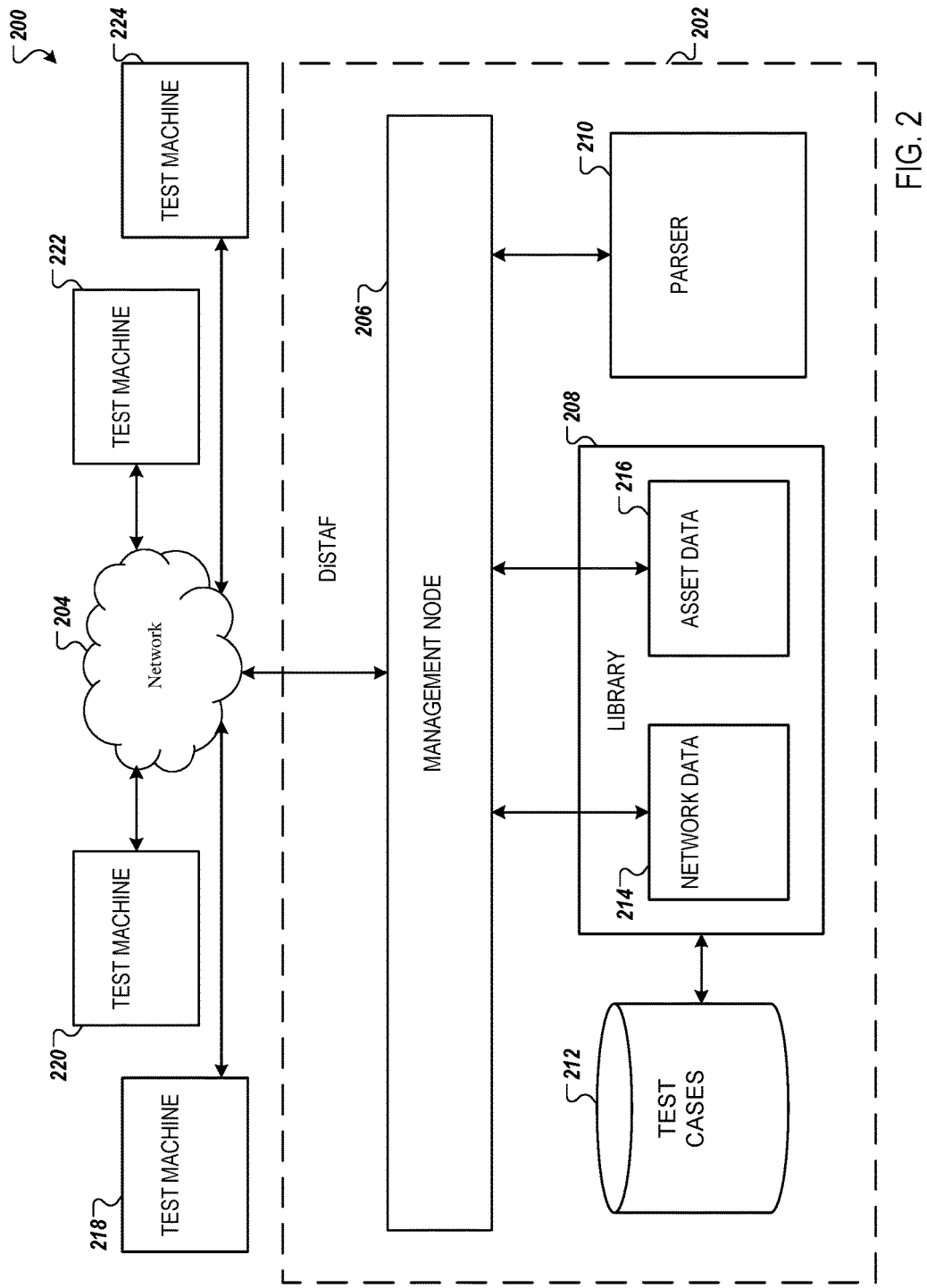
FIG. 2 depicts a high-level component diagram of an example of a test system 200 for a distributed computer system in accordance with one or more aspects of the present disclosure.

FIG. 2 depicts a high-level component diagram of an example of a test system 200 for a distributed computer system in accordance with one or more aspects of the present disclosure. The illustrated example is similar to that described above with reference to FIG. 1. However, FIG. 2 includes a network 204 to which the test machines 218-224 are connected. In the illustrative example, a distributed system, such as a distributed file system, may be provided by a network 204 with network attached test machines 218-224. For example, one or more of the test machines 218-224 may be part of a attached storage (NAS) system comprising one or more server computer systems each coupled to one or more persistent data storage devices, such as magnetic or optical storage disks, solid-state drives (SSDs), etc. "Computer system" herein shall refer to a system comprising one or more processors, one or more memory devices, and one or more input/output (I/O) interfaces. Further, portions of the framework 202 may include network attached components. For example, the test case repository 212 may be a network attached storage device. Other components of the framework 202 may also be local, network attached, remote devices or modules, other types of connections or components.

In some examples described herein, a server computer system may execute a file system server daemon to manage file input/output (I/O) requests originated by one or more file system clients. One or more client computer systems can execute a file system client daemon to communicate with one or more servers.

A file system client may request the file system configuration information from an external computer system (e.g., a file system server or a peer client). The file system configuration information may comprise the system topology information (e.g., the number of servers, the server connection information, replica relationships between the servers, etc.). Responsive to receiving the requested configuration information, the file system client may construct a configuration graph reflecting the distributed file system configuration. In an illustrative example, the file system configuration graph can be represented by a tree-like data structure comprising a root node corresponding to the file system mount point, two or more terminal ("leaf") nodes corresponding to the file system servers, and two or more intermediate nodes referred to as "translators." The translators may process I/O requests and responses traversing the graph, as described in more details herein below. Responsive to constructing the configuration graph, the file system client may create connections to the file system servers referenced by the leaf nodes of the graph.

The file system client may employ the file system configuration graph to process file access requests issued, e.g., by one or more applications executed by the client computer system. Each file access request may traverse the graph from the mount point to one or more leaf nodes via one or more translators. Responses corresponding to the file access requests may traverse the graph following the reverse route.

Figure 3:
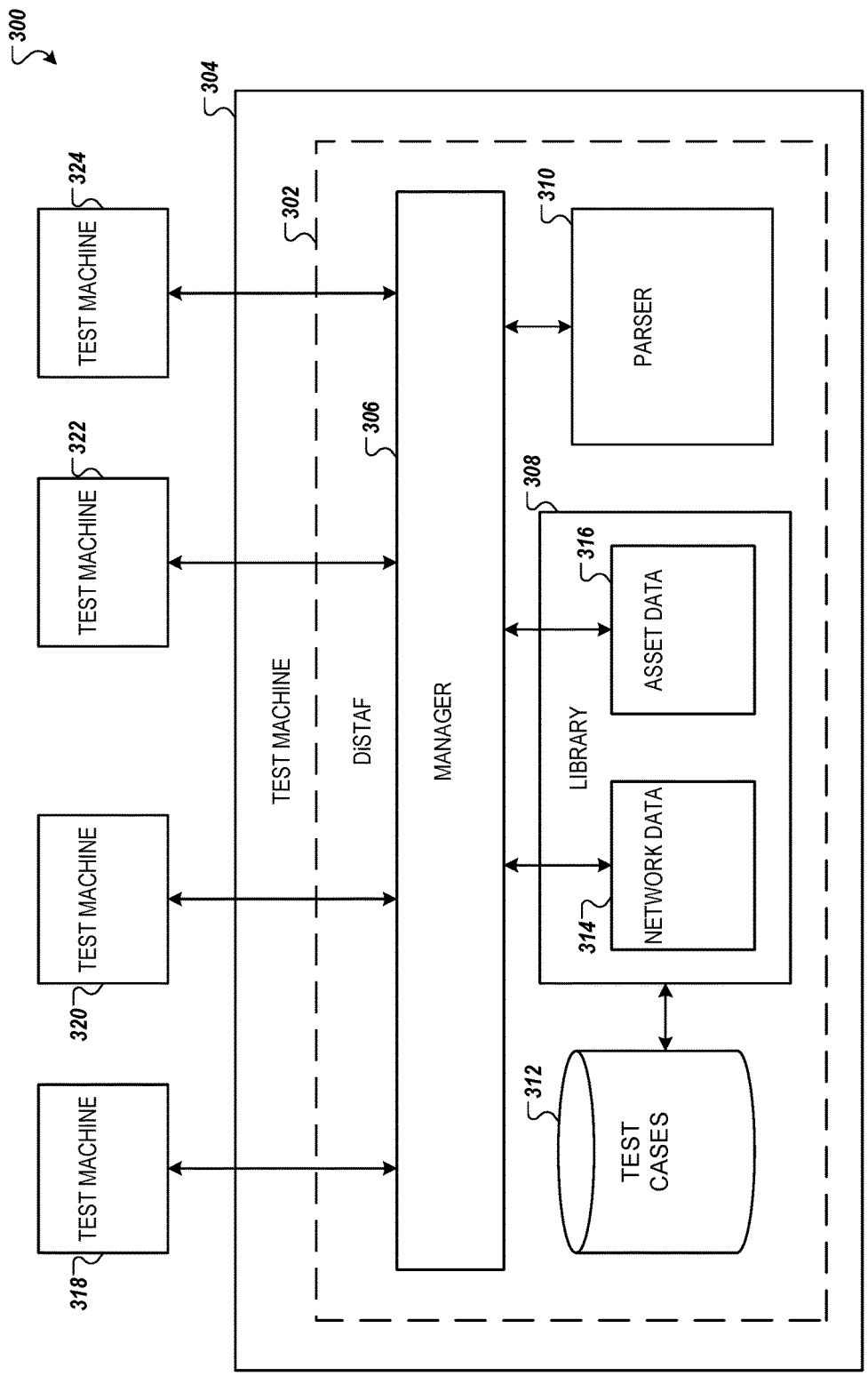
FIG. 3 depicts a high-level component diagram of an example of a test system 300 for a distributed computer system in accordance with one or more aspects of the present disclosure.

FIG. 3 depicts a high-level component diagram of an example test system 300 for a distributed computer system in accordance with one or more aspects of the present disclosure. In the illustrated example, the framework 302 is part of a test machine 304. In this example, the test machine 304 may operate the framework 302 to execute tests relative to itself as well as other test machines 318-324. In the illustrated example, the entire framework 302 is operated from the test machine 304. In some examples, one or more components of the framework 302 may be stored or operated from another test machine. For example, the management node 306 may be run from the test machine 304 while the test case repository 312, the parser 310, or the library 308 may be located on another of the test machines 318-324. Other manners of storing or organizing the framework 302 may be incorporated.

Figure 4:
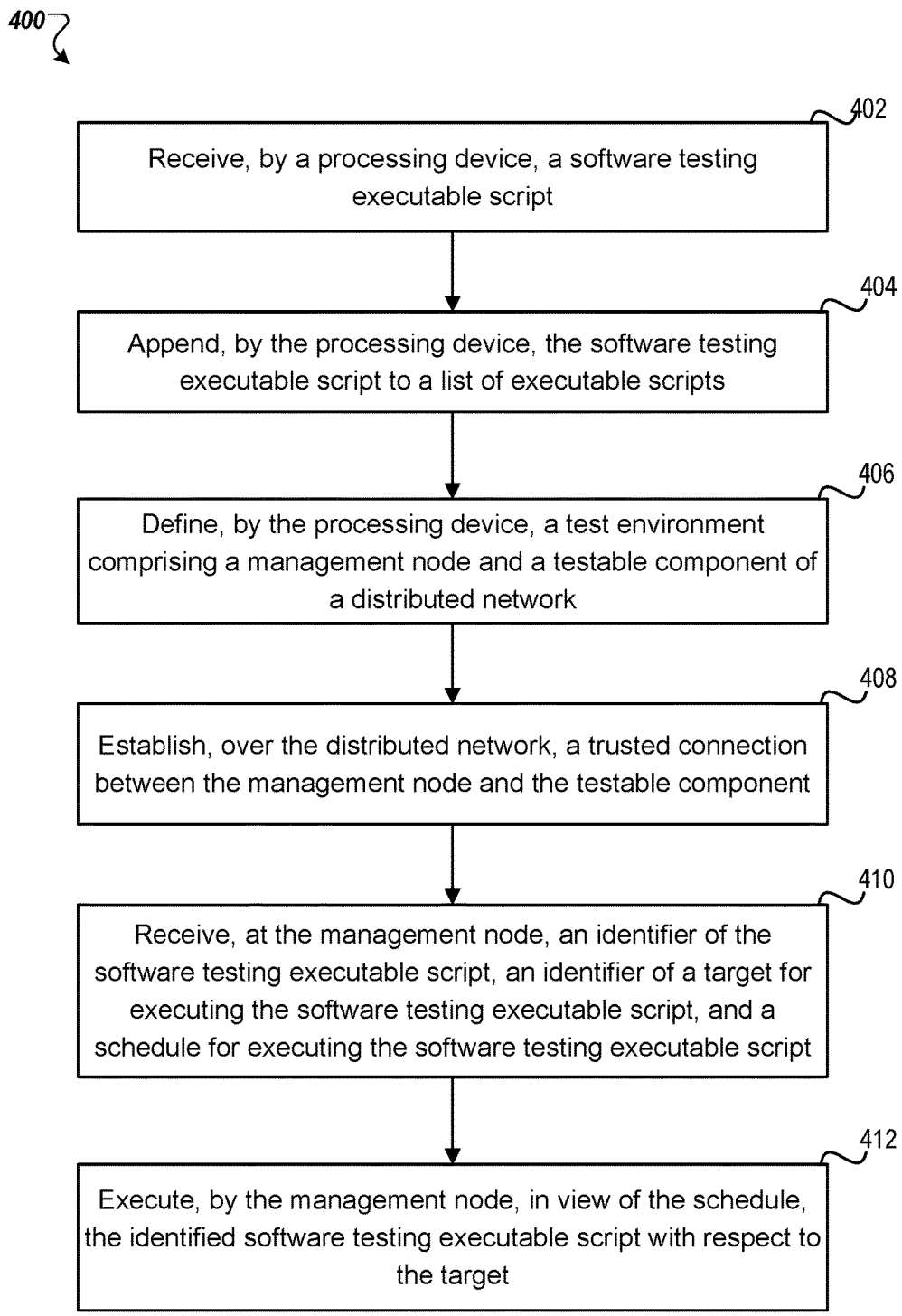
FIG. 4 depicts a flow diagram of an example method for test automation for distributed systems, in accordance with one or more aspects of the present disclosure.

FIG. 4 depicts a flow diagram of example of a method for test automation for distributed systems, in accordance with one or more aspects of the present disclosure. At block 402, of FIG. 4, a processing device receives a software testing executable script. At block 404, the processing device appends the software testing executable script to a list of executable scripts. The list may include multiple scripts available for testing a component of the distributed system. At block 406, the processing device defines a test environment comprising a management node and a testable component of a distributed network. The testable component may include a hardware or software component of the distributed network. At block 408, a trusted connection is established over the distributed network between the management node and the testable component. At block 410, the management node receives an identifier of the software testing executable script, an identifier of a target for executing the software testing executable script, and a schedule for executing the software testing executable script. The identifier of the software testing executable script identifies the script from the list of executable scripts. The identifier of the target identifies the testable component with respect to which the script may be executed. The schedule determines when and in what order any scripts may be executed. At block 412, the management node executes the identified software testing executable script with respect to the target and in view of the schedule.

Figure 5A:
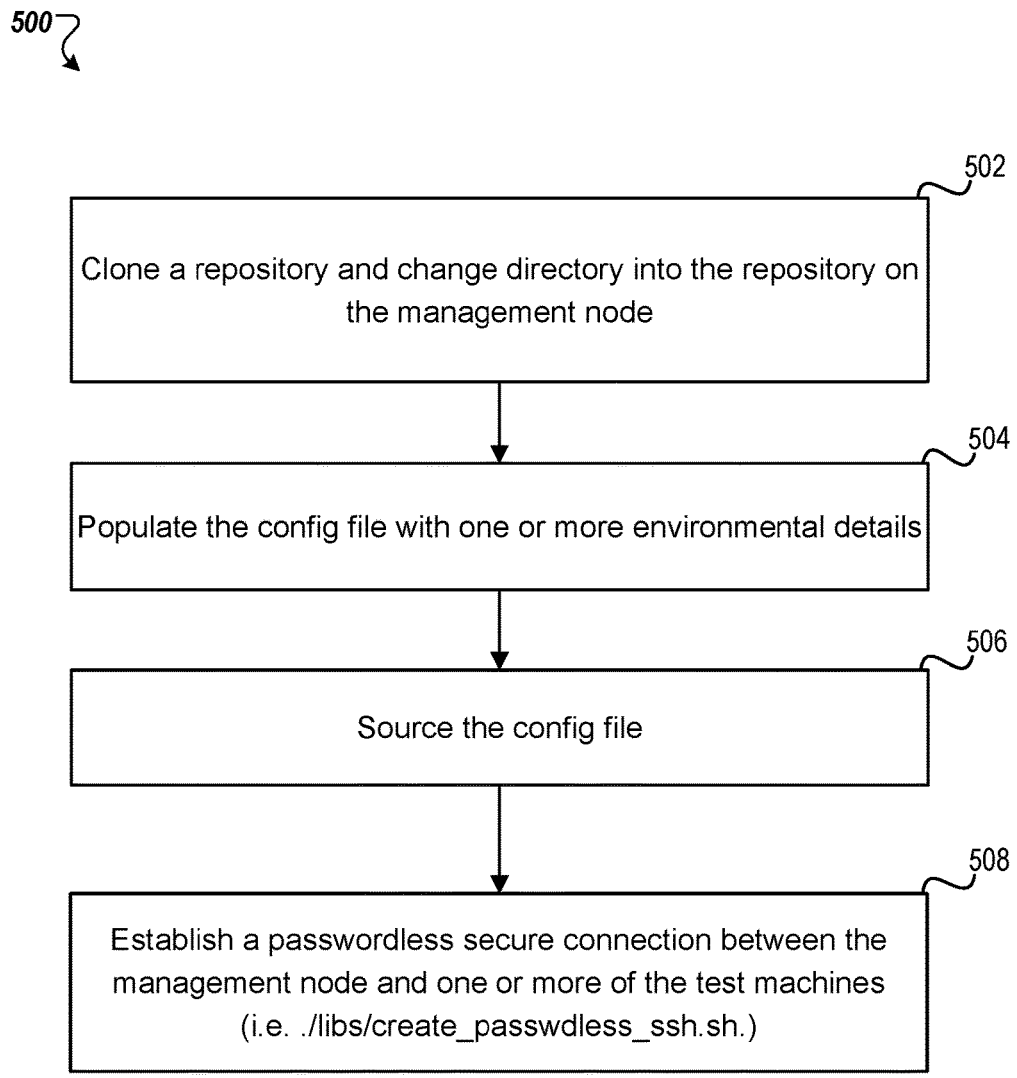
FIG. 5A depicts a flow diagram of an example method for setting up a test in accordance with examples of the present disclosure.

FIG. 5A depicts a flow diagram of an example method 500 for setting up a test in accordance with examples of the present disclosure. At block 502, the management node changes directory into the cloned repository. At block 504, the management node may populate the configuration ("config") file with environmental details or variables. At block 506, the management node sources, or executes, the config file. At block 508, the management node establishes a secure connection (such as a passwordless connection) between the management node and a test machine, component, or other portion of the distributed system.

Figure 5B:
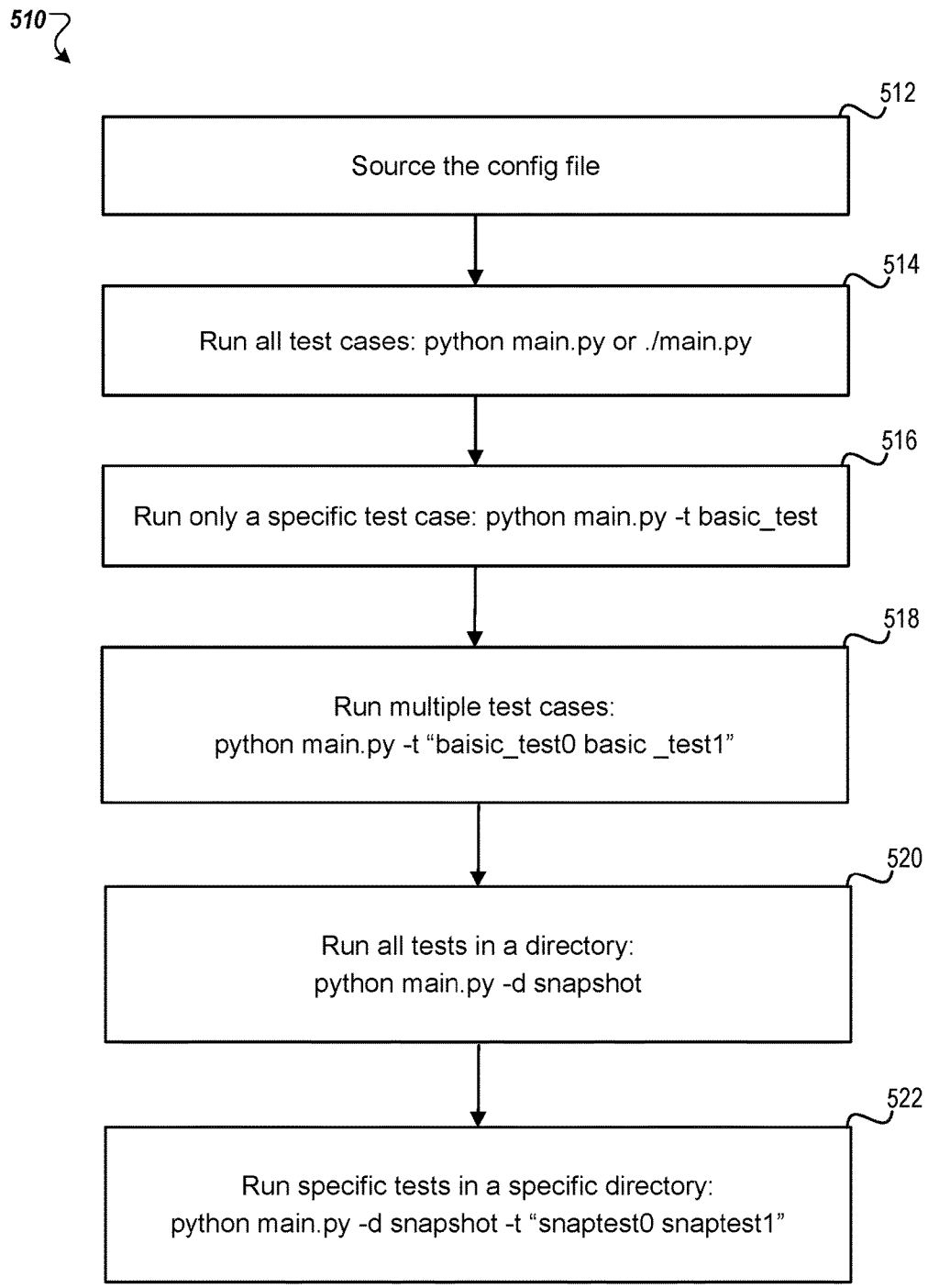
FIG. 5B depicts a flow diagram of an example method for running a test in accordance with examples of the present disclosure.

FIG. 5B depicts a flow diagram of an example method for running a test in accordance with examples of the present disclosure. In this method 510, the blocks may be carried out in the order shown, individually, or in other orders and combinations. At block 512, the management node sources the config file. At block 514, one option available is to run all of the test cases using the example Python language. At block 516, another option is to run only a specific test case. At block 518, multiple test cases may be executed by the management node. At block 520, the management node may run all of the test cases and associated scripts in a single directory. At block 522, the management node may execute the example Python language to run specific test in a specified directory. Other manners of running selected tests in selected directories may be implemented.

In one example, the manner in which the results of the tests are recorded may be set by default or modified by changing the file path of the log file process.

One example of a process to write a test for the distributed system 104 may include creating a directory inside a location (such as ./tests_d) with the name of the target component for testing (Python). In some examples, it may be advantageous, with regards to importability to name the test in a format importable by the specific language used to conduct the tests. For example, a Python test may follow the "test_test name.py" format. Other languages may incorporate other formats.

Figure 6:
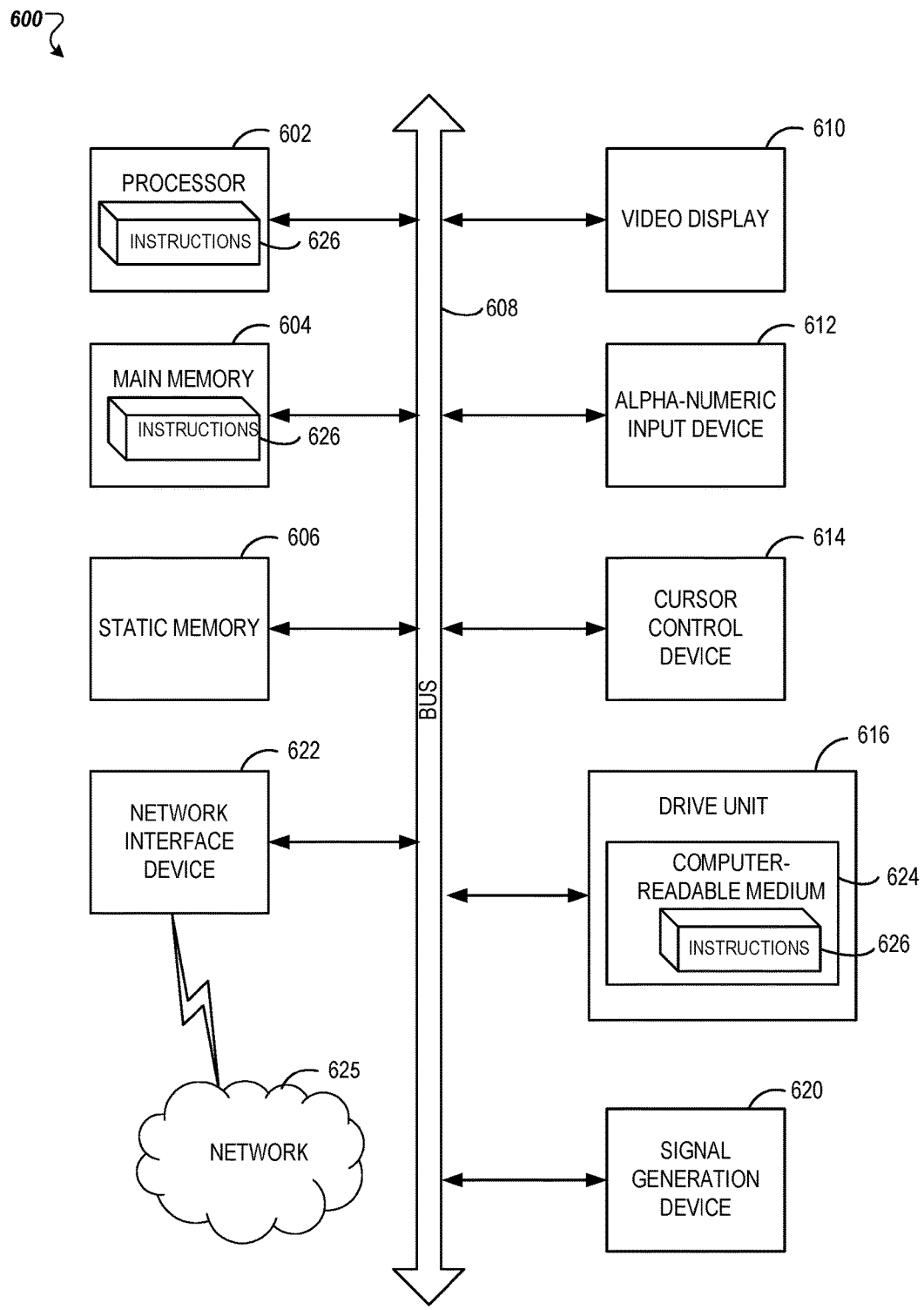
FIG. 6 depicts a block diagram of an illustrative computer system operating in accordance with examples of the present disclosure.

FIG. 6 depicts an example computer system 600 which can perform any one or more of the methods described herein for isolating network resources in a virtualized environment. In one example, computer system 600 may correspond to computer system 100 of FIG. 1. The computer system may be connected (e.g., networked) to other computer systems in a LAN, an intranet, an extranet, or the Internet. The computer system 600 may operate in the capacity of a server in a client-server network environment. The computer system 600 may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a drive unit 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions that may include instructions to execute instructions 626 for performing the operations and steps discussed herein. For example, in one example, the instructions 626 may perform any one of the methods of flow diagram 400 of FIG. 4 and flow diagram 500 of FIG. 5.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The drive unit 616 or secondary memory may include a computer-readable medium 624 on which is stored one or more sets of instructions 626 (e.g., instructions for the instructions) embodying any one or more of the methodologies or functions described herein. Instructions for the instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622. The instructions 626 may further be transmitted or received over a network 625 via the network interface device 622.

The non-transitory computer-readable storage medium 624 may also be used to store the instructions 626 persistently. While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, non-transitory computer-readable storage mediums, solid-state memories, optical media, and magnetic media.

The instructions 626, components and other features described herein can be implemented as discrete hardware components or integrated in the functionality of hardware components such as ASICS, FPGAs, DSPs or similar devices. In addition, the instructions 626 can be implemented as firmware or functional circuitry within hardware devices. Further, the instructions 626 can be implemented in a combination hardware devices and software components. For example, the functionality of this module can exist in a fewer or greater number of modules than what is shown, with such modules residing at one or more computing devices that may be geographically dispersed. The modules may be operable in conjunction with network 625 from which it may receive and provide relevant information regarding isolating network resources in a virtualized environment.

Figure 7:
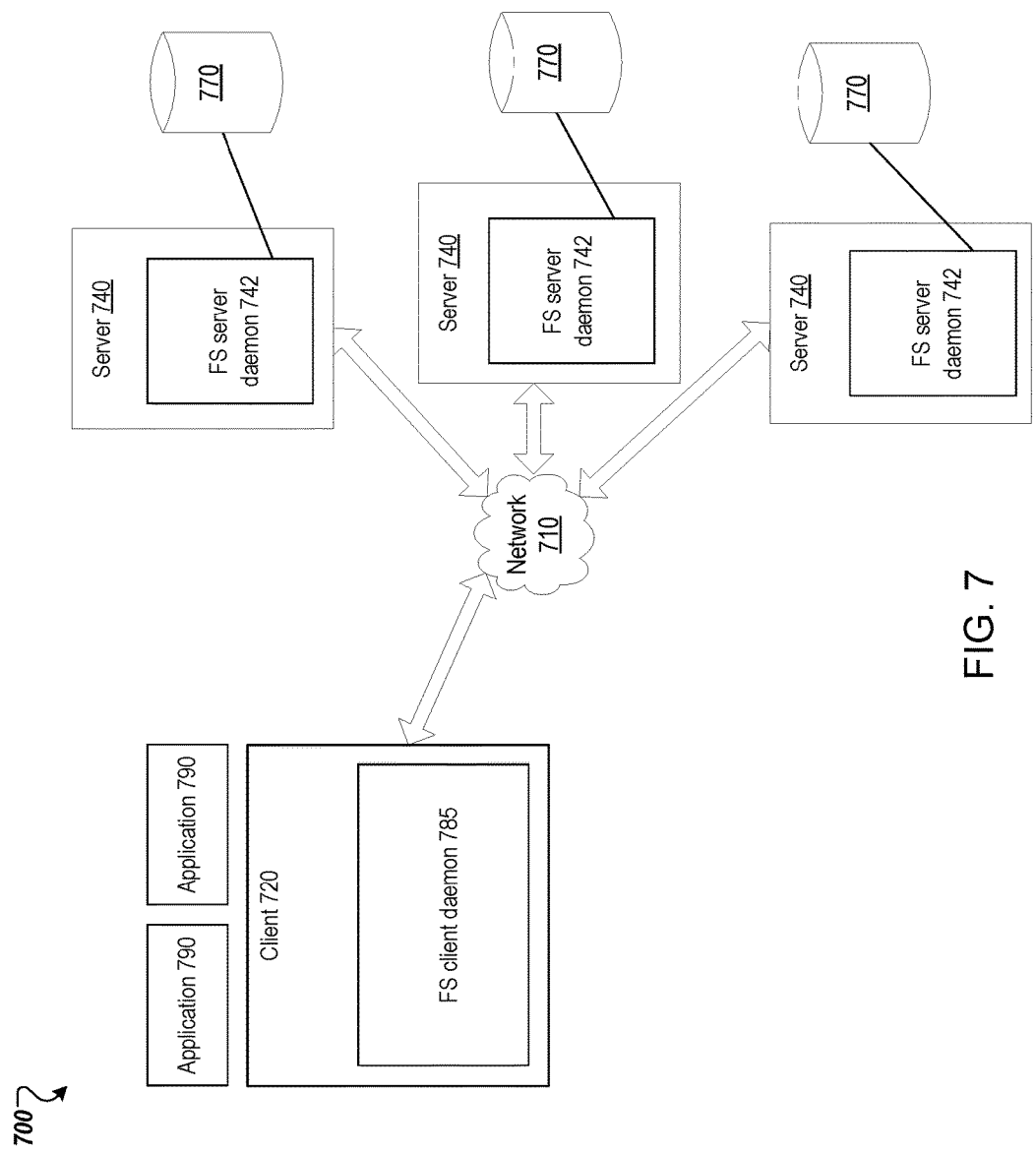
FIG. 7 depicts a high-level component diagram of an example of a distributed system in accordance with examples of the present disclosure.

FIG. 7 schematically depicts a high-level component diagram of an example distributed file system 700 in accordance with one or more aspects of the present disclosure. In certain implementations, distributed file system 700 may support data replication, load balancing, and other functions related to providing file system services.

Distributed file system 700 may include one or more servers 740 configured to individually and/or collectively service file access request (such as requests to create, access or modify a specified file). In an illustrative example of FIG. 7, each server 740 may include one or more data storage devices 770. "Data storage device" herein shall refer to a memory device, such as a disk, RAID array, EEPROM device, or any other device capable of storing data.

One or more client computers 720 may be communicatively coupled, e.g., over a network 710, to servers 740. Network 710 may be provided by one or more local area networks, one or more wide area networks, or any combination thereof. Client computer 720 may be provided by a computer system including a processor, a memory, and at least one communication interface (the above noted components of client computer 720 are omitted from FIG. 7). Client computer 720 can execute one or more applications 790.

Server 740 may run a file system server daemon (or any other component such as a module or program) 742 to export a local file system to clients 720 as a volume accessible by the clients.

File system client daemon 785 running on client computers 720 may connect to servers via an application-level protocol implemented over TCP/IP, InfiniBand or other transports, and access multiple volumes exported by server 740 via one or more translators, as described in more details herein below.

To locally mount a distributed file system volume, a file system client may request the file system configuration information from an external computer system (e.g., a file system server or a peer client). Responsive to receiving the requested configuration information, the file system client may construct a configuration graph reflecting the distributed file system configuration and the corresponding translator configuration.

Figure 8:
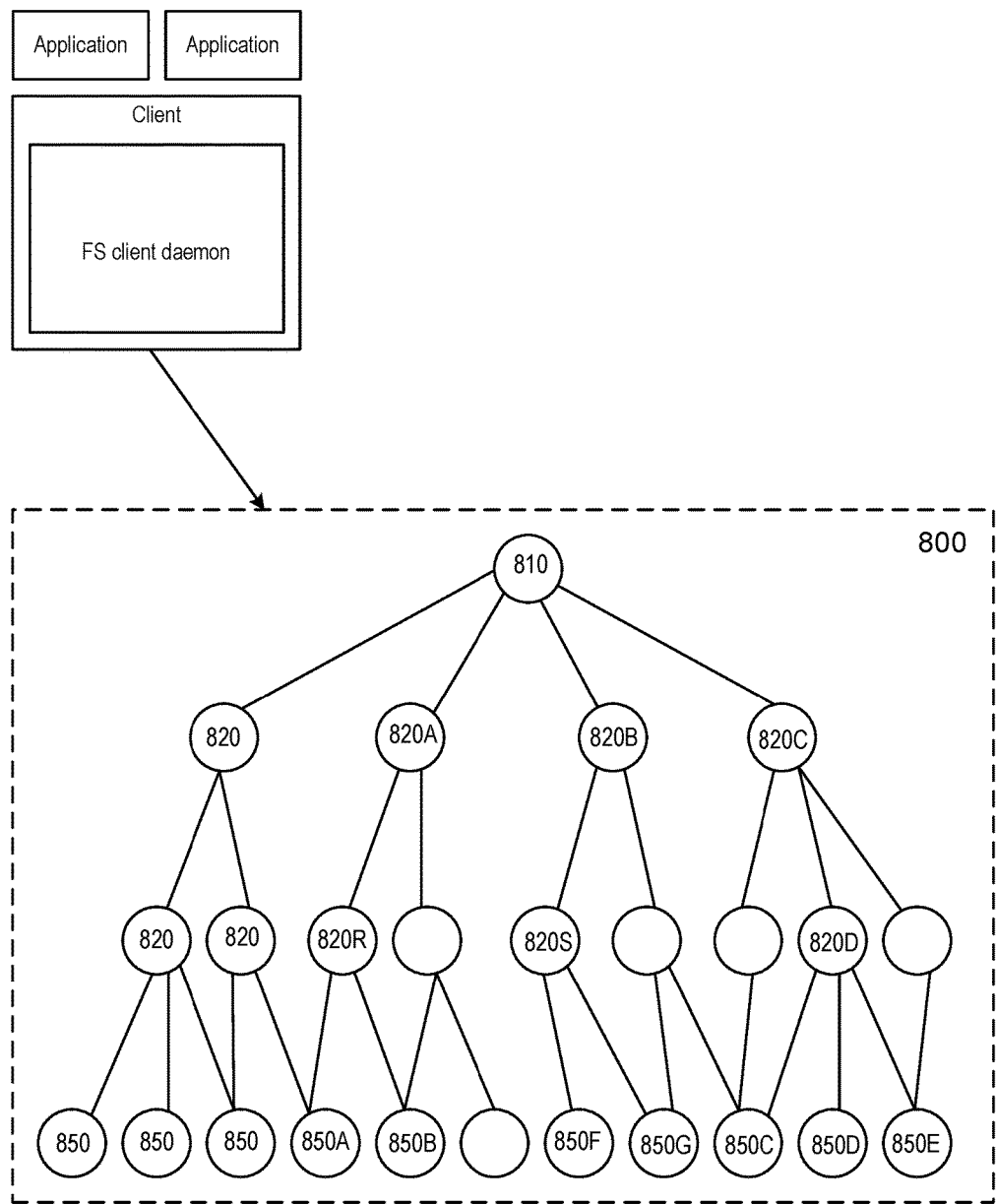
FIG. 8 depicts a high-level component diagram of a configuration of a distributed system in accordance with examples of the present disclosure.

As schematically illustrated by FIG. 8, a file system configuration graph 800 can be represented by a hierarchical data structure comprising a set of linked nodes. In certain implementations, file system configuration graph 800 may be represented by a tree comprising a root node 810 corresponding to the file system mount point, two or more leaf nodes 850 corresponding to the file system servers, and two or more intermediate nodes 820 also referred to as "translators." The translators may process I/O requests and responses traversing the graph, as described in more details herein below. Responsive to constructing the configuration graph, the file system client may create connections to the file system servers referenced by the leaf nodes of the graph, thus completing the file system mounting process.

The client may employ the configuration graph to process file access requests issued by applications executed by the client computer system. Each file access request may traverse the graph from the mount point to one or more leaf nodes via one or more translators. Responses corresponding to the file access requests may traverse the graph following the reverse route.

In an illustrative example, a replicate translator 820R may receive a write request from its parent node 820A and perform corresponding write operations on two or more of its child nodes 850A-850B. In another illustrative example, a distribute translator 820D may receive a write request from its parent node 820C and select, among its child nodes 850C-850E, a node to perform the corresponding write operation. In a further illustrative example, a stripe translator 820S may receive a write request from its parent node 820B and split the write request into two or more write requests to be processed by two or more child nodes 820E-820G.

The configuration of distributed file system 800 may be changed by adding or removing servers, migrating files and/or volumes, adding or migrating replicas of a file, etc. In certain implementations, clients may be notified of file system configuration changes, e.g., by a file system server. Alternatively, the client may periodically or responsive to a certain event request configuration updates from a file system server and/or from a peer client.

Responsive to receiving a configuration change notification or otherwise determining that the file system configuration has been changed, the client may request the updated configuration information from a file system server or from a peer client. Based on the updated configuration information reflecting the new file system configuration, the client may construct a new configuration graph, and establish connections with the servers referenced by the leaf nodes of the new configuration graph. The connections established to the servers referenced by the leaf nodes of the previous configuration graph may be terminated by either the client or the respective servers.

Figure 9:
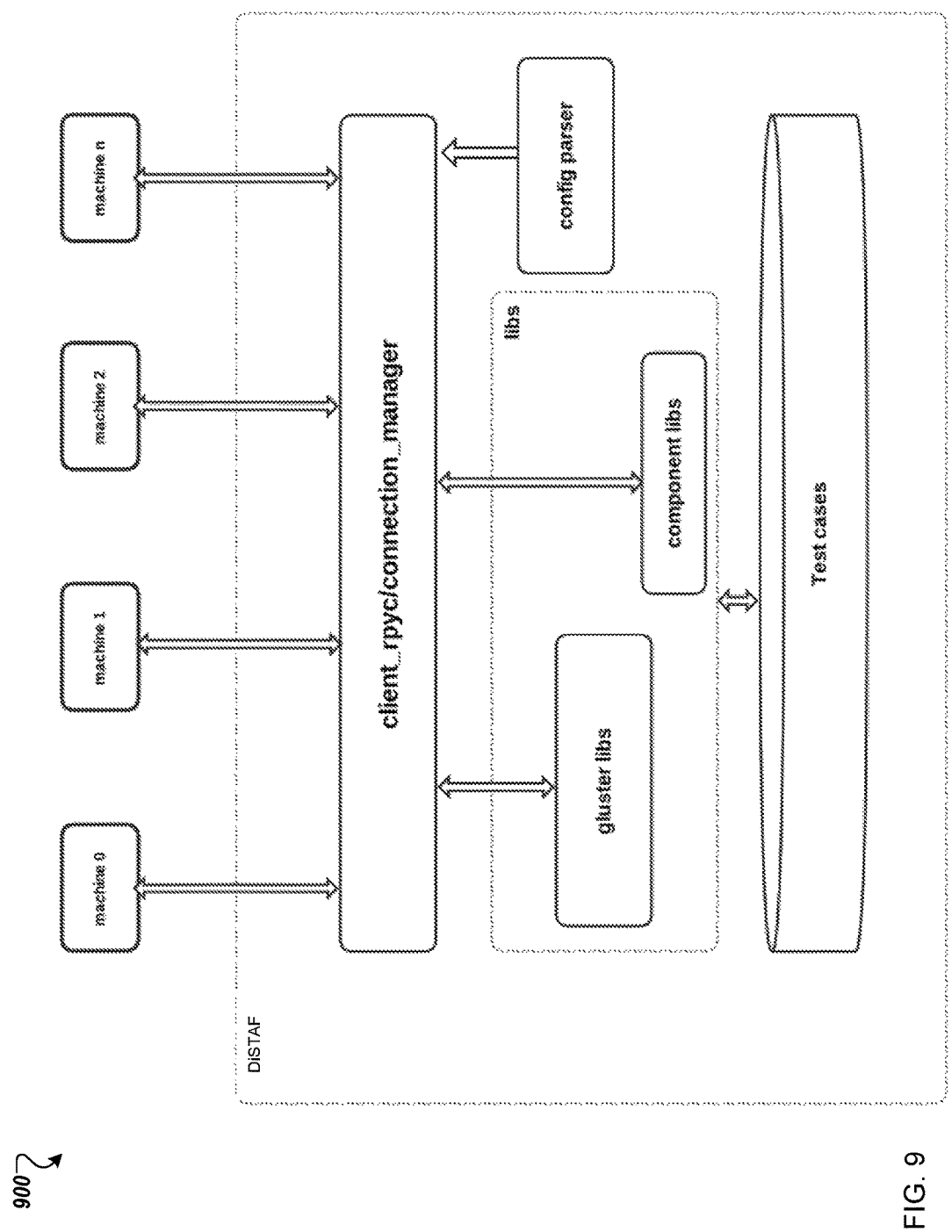
FIG. 9 depicts a high-level component diagram of an example of a test system for a distributed computer system in accordance with one or more aspects of the present disclosure.

FIG. 9 depicts a high-level component diagram of an example of a test system 900 for a distributed computer system in accordance with one or more aspects of the present disclosure. In the illustrated example, a specific implementation is presented. In this example, the management node is a client rpyc (Python-specific)/connection manager. Other examples may use other programming languages and code to form the components and modules of the framework. In the depicted example of the test system 900, the DiSTAF is specifically setup to interact with a Gluster® system of test machines. Other examples and approaches may be setup to operate on other systems and organizations.

FIGS. 10A-10D depict example code for a test framework for distributed networks in accordance with one or more aspects of the present disclosure. FIG. 10A depicts example Python code for establishing variables for the framework. FIG. 10B depicts example Python code for one example of an application programming interface (API). FIG. 10C depicts one example of a test script. FIG. 10D depicts example code for running a test from the framework.

The code of FIGS. 10A-10D is shown and described in order to provide some examples of implementations of a test framework for a distributed system. Other manners of accomplishing the same tasks in other ways or programming languages may be included.

Systems and methods described herein may be advantageously employed for testing applications that utilize a distributed file system and/or for testing components of a distributed file system. Such components may include applications, memory devices, processors, interfaces, user-space drivers, translators, busses, etc.

As described herein, some examples of the systems and methods may be advantageously employed in conjunction with application containers. "Application container" or "container" herein shall refer to an interface between a host and a software application. The software application may comprise one or more related processes and may provide a certain service (e.g., an HTTP server, a database server, etc.). The host may be represented by a host computer system or by a virtual machine being executed by a host computer system. In the containerized execution model, the application and its dependencies (such as binaries and/or libraries that as necessary to run the application) run within the application container, which is an isolated process in the user space of the host operating system, sharing the kernel with other containers It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "allocating", "notifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
receiving, by a processing device, a software testing executable script;
appending, by the processing device, the software testing executable script to a list of executable scripts;
defining, by the processing device, a test environment comprising a management node and a testable component of a distributed network;
establishing, over the distributed network, a trusted connection between the management node and the testable component;
receiving, at the management node, an identifier of the software testing executable script, an identifier of a target for which the management node is to execute the software testing executable script, and a schedule for executing the software testing executable script, wherein the management node is separate from the target; and
executing, by the management node, in view of the schedule, the identified software testing executable script with respect to the target.

2. The method of claim 1, wherein the testable component comprises at least one of: an application container, a virtual machine, or a hardware server.

3. The method of claim 1, wherein the software testing executable script comprises at least one of: a binary executable module or a shell script.

4. The method of claim 1, wherein establishing the trusted connection comprises authenticating the test environment by the management node.

5. The method of claim 1, wherein establishing the trusted connection comprises authenticating the management node by the test environment.

6. The method of claim 1, further comprising running a synchronous command over the trusted connection.

7. The method of claim 1, further comprising establishing a second trusted connection in response to a call for an asynchronous command.

8. The method of claim 1, further comprising logging, at the management node, a result of executing the software testing executable script.

9. A computer system comprising:
a memory; and
a processing device coupled to the memory to:
receive a software testing executable script;
append the software testing executable script to a list of executable scripts;
identify a test environment comprising a management node and a testable component of a distributed network;
establish, over the distributed network, a trusted connection between the management node and the testable component;
receive an identifier of the software testing executable script, an identifier of a target for which the management node is to execute the software testing executable script, and a schedule for execution of the software testing executable script, wherein the management node is separate from the target; and
execute, in view of the schedule, the identified software testing executable script with respect to the target.

10. The computer system of claim 9, wherein the identifier of the target comprises an address of the testable component.

11. The computer system of claim 9, wherein the identifier of the target comprises a resolvable hostname of the testable component.

12. The computer system of claim 9, wherein the processing device is further to run a synchronous command over the trusted connection.

13. The computer system of claim 9, wherein the processing device is further to establish a second trusted connection in response to a call for an asynchronous command.

14. The computer system of claim 9, wherein the testable component comprises a virtual machine, a container, or a physical machine.

15. The computer system of claim 9, wherein the processing device is further to log a result of the software testing executable script based on a response of the test environment received over the trusted connection.

16. The computer system of claim 9, further comprising a library module to store information relating to a structure of the distributed network and information relating to the test environment.

17. The computer system of claim 16, wherein the management node further comprises an application programming interface to communicate with the library module to access the information stored in the library module.

18. A computer-readable non-transitory storage medium comprising executable instructions that, when executed by a computer system, cause the computer system to:
   identify, by the processing device, a test environment comprising a management node and a testable component of a distributed network;
   establish, by the processing device, over the distributed network, a trusted connection between the management node and the testable component;
   receive an identifier of a stored software testing executable script, an identifier of a target for which the management node is to execute the software testing executable script, and a schedule for execution of the software testing executable script, wherein the management node is separate from the target;
   execute, by the processing device, in view of the schedule, the identified software testing executable script with respect to the target; and
   log, by the management node, a result of the software testing executable script based on a response of the target received over the trusted connection.

19. The computer-readable non-transitory storage medium of claim 18, wherein the identifier of the target comprises an address of the testable component.

20. The computer-readable non-transitory storage medium of claim 18, wherein the identifier of the target comprises a resolvable hostname of the testable component.

* * * * *